United States Patent [19]

Schalke et al.

[11] Patent Number: 5,453,109

[45] Date of Patent: Sep. 26, 1995

[54] METHOD FOR THE PREPARATION OF A HARDENING SALT IN PIECE FORM AND PRODUCT

[75] Inventors: Peter Schalke, Ingelheim; Eberhard Mueller, Mainz-Mombach; Matthias Kremer, Wiesbaden; Georg Wahl, Rodenbach, all of Germany

[73] Assignee: Durferrit GmbH Thermotechnik, Mannheim, Germany

[21] Appl. No.: 274,428

[22] Filed: Jul. 13, 1994

[30] Foreign Application Priority Data

Jul. 23, 1993 [DE] Germany .............. 43 24 740.7

[51] Int. Cl.⁶ .................................................. C21D 1/607
[52] U.S. Cl. ................................. 75/300; 75/770; 148/27
[58] Field of Search ................ 148/27; 75/300, 75/770

[56] References Cited

U.S. PATENT DOCUMENTS

| | | | |
|---|---|---|---|
| 2,002,180 | 5/1935 | Holden | 148/27 |
| 2,801,154 | 7/1957 | Pree et al. | 148/27 |
| 4,019,928 | 4/1977 | Beyer et al. | 148/27 |

OTHER PUBLICATIONS

Firma Degussa *Durferrit* Apr. 1975 pp. 1–3.
*Fachberichte*, Sep. 9, 1985 vol. 23, No. 9 pp. 727–733.

*Primary Examiner*—Melvyn Andrews
*Attorney, Agent, or Firm*—Beveridge, DeGrandi, Weilacher & Young

[57] ABSTRACT

A method for the preparation of a salt mixture useful for hardening steel parts, including of potassium cyanate, potassium carbonate and sodium carbonate, wherein 2.2 to 2.3 moles of urea is first reacted with 1 mole of potassium carbonate to form potassium cyanate. The escaping ammonia is converted with formaldehyde into hexamethylenetetramine. The reaction product, which is potassium cyanate and potassium carbonate, is ground, mixed with powdered sodium carbonate and pressed at between 80° and 230° C. into shaped pieces.

13 Claims, No Drawings

METHOD FOR THE PREPARATION OF A HARDENING SALT IN PIECE FORM AND PRODUCT

INTRODUCTION AND BACKGROUND

The present invention relates to a method for the preparation of a salt mixture, composed of potassium cyanate, potassium carbonate and sodium carbonate as a product in piece form. The product can be used for the purpose of hardening steel parts. The method can be carried out by reacting urea with potassium carbonate and admixing sodium carbonate, with recovery of the ammonia formed during the reaction in the form of hexamethylenetetramine by means of formaldehyde.

Salt mixtures containing ions of sodium, potassium, carbonate and cyanate in predetermined quantitative proportions are used in liquid form for the hardening of steel parts according to well known techniques. For the melting and replenishing of these hardening salt baths, the salt mixture has to be prepared in the form of solid pieces or lumps. Powders cannot be used for practical technical reasons.

In order to prepare these shaped pieces of hardening salt, it is known for example that in the first place urea is reacted with potassium carbonate (approximately 2.8 moles of urea with 1 mole of potassium carbonate) to form potassium cyanate, with the liberation of ammonia, carbon dioxide and water. The yield is approximately 65 to 70% based on the amount of urea. The ammonia thus liberated is converted by means of an aqueous formaldehyde solution to hexamethylenetetramine, which can be utilized elsewhere. The approximately 98% potassium cyanate thus prepared is mixed with the quantities of potassium carbonate and sodium carbonate required for the hardening salt mixture, melted at 600° C. and cast into suitable composites.

This known method has the disadvantage that, in the reaction of urea with potassium carbonate, at a temperature of about 400° C. sublimation of urea occurs, which contaminates the solution of hexamethylenetetramine and leads to problems in utilizing the latter. Furthermore, the finished powder mixture has to be melted, as this powder cannot be compacted using the conventional powder presses. Melting, for which temperatures of approximately 600° C. are required, results in material handling problems and the formation of cyanide, which is undesirable.

Moreover, it is known that a mixture of urea, potassium carbonate and sodium carbonate in the mixing ratio necessary for the composition of the hardening salt can be heated up to approximately 600C. Ammonia, carbon dioxide and water are evolved instantly at the onset of the reaction, so that the ammonia must be combusted, as it carries with it excessive contamination by entrained urea and alkali carbonates and hence cannot be usefully employed. The reacted melt must then be cast into composites.

This method has the disadvantage that the yield of potassium cyanate, based on urea, is only about 60% and varies greatly within the individual batches. This varying cyanate content has an adverse effect on the quality of the hardening salt. The melt has the same problems as the above-mentioned method. Moreover, the ammonia can no longer be recycled.

Summary of the Invention

An object of the present invention was therefore to develop a method for the preparation of a salt mixture for the hardening of steel parts which overcomes problems of the past.

In attaining the above and other objects, one feature of the invention resides in a salt composed of potassium cyanate, potassium carbonate and sodium carbonate in shaped piece form. A further feature of the invention resides in a process of reacting urea with potassium carbonate and admixing sodium carbonate, with recovery of the ammonia formed during the reaction in the form of hexamethylenetetramine solutions by means of formaldehyde.

It was a further object of the invention to obtain a good yield of cyanate based on urea without variations in the individual batches and without formation of cyanide as a by product. Still further, it was a further object to obtain a reacted product that can be compacted as a powder using conventional presses, and to recover the ammonia formed in as great a quantity as possible in the form of pure hexamethylenetetramine solutions.

In achieving the above and other objects, the present invention is carried out by first reacting 2.2 to 2.3 moles of urea with 1 mole of potassium carbonate at between 350° and 400° C. to obtain a reaction product. The reaction product is then converted into a powder by grinding so that the resulting powder has an average particle size of from 125 to 250 µm. The powder so obtained is then mixed with powdered sodium carbonate having an average particle size of from 20 to 125 µm to obtain a powdered mixture. The latter mixture is thereafter pressed into shaped pieces at temperatures of from 80° to 230° C. and pressures of from 65 to 100 kN/cm$^2$.

The new method of the invention is conducted in two stages. In the first stage, urea and potassium carbonate are reacted together to form potassium cyanate. However a definite excess of potassium carbonate, for example, of approximately 10% is used. This gives rise in one step to a melt of potassium carbonate and potassium carbonate containing approximately 10–12% of potassium carbonate and 88–90% of potassium cyanate. Then in the second stage, the melt is converted into a powder by being left to cool to solidify to a solid and then grinding the resulting solid. The formation of the unwanted cyanide is thereby limited to a few ppm.

With this mode of operation the exploitation of urea is particularly high, amounting to 78–80%, the ammonia obtained is particularly clean and can be easily converted to hexamethylenetetramine. The hexa-solution is very clean. This improved quality is primarily due to the improved exploitation of urea. Far less urea reaches the stage of the conversion reaction with the formaldehyde. The better the exploitation of urea, the fewer the problems with quality that can arise.

DETAILED DESCRIPTION OF THE INVENTION

In carrying out the method of the invention, if urea undergoes decomposition without reacting with the potassium carbonate to produce potassium cyanate, two moles of ammonia are formed from every one mole of urea. However, if urea does react to produce cyanate, only one mole of ammonia is liberated. Hence the better the conversion of urea, the lesser are the amount of formaldehyde required and the formation of hexamethylenetetramine.

The powder mixture obtained by the method of the invention can be compacted in a relatively simple manner. For this purpose the conventional powder presses commercially available are adequate. Good compaction is achieved if the sodium carbonate portion is as finely divided as possible. This fineness is achieved by grinding a fine-grained sodium carbonate once again prior to compaction. After the grinding operation at least 50%, preferably 80%, of the powdered sodium carbonate should be smaller than 125 μm. The potassium cyanate/potassium carbonate powder should preferably be coarser than the sodium carbonate powder; approximately 50–60% should therefore be larger than 125 μm. A further condition for good compaction is that the temperature of the powder mixture to be compacted be sufficiently high. The temperature should be at least 80° C., preferably above 100° C. and leads to good results in the temperature range between 150° and 200° C.

Compaction takes place at pressures of from 65 to 100 kN/cm$^2$. In contrast to a potassium cyanate-potassium carbonate-sodium carbonate mixture, which cannot be pressed into solid composites, the powder mixture formed by the method according to the invention can be compacted relatively easily, probably because the potassium carbonate is already embedded in the potassium cyanate.

A product is obtained that scarcely shows variations in the cyanate content of the individual batches. A high yield of cyanate referred to the urea used is attained in the reaction, with a pure hexamethylenetetramine solution being obtained which can be processed further without difficulty.

The following examples illustrate the method according to the invention in more detail.

Example 1

270 kg per hour of urea and 278 kg per hour of potassium carbonate in the form of a solid mixture are introduced continuously into a stirred tank gas-fired to 370° C. The two substances react together in the stirred tank. The reaction gas evolved is exhausted by means of a fan and blown through a hot water washer. The latter is at a temperature of approximately 75°–85° C. and is for adsorption of the entrained potassium carbonate/potassium cyanate dust. The other components of the gases, in particular the ammonia, pass through this washing stage and enter a second washer, wherein pH-adjusted aqueous formaldehyde solution is added. Here the ammonia portion of the reaction gas is reacted with formaldehyde to form an aqueous solution of hexamethylenetetramine. The latter is continuously pumped out for further processing. The hexamethylenetetramine isolated dissolves in water and methanol to give a clear solution and is thus in perfect condition.

A liquid melt at a temperature of 370° C. remains in the stirred tank. The liquid melt is allowed to flow out of the stirred tank at a rate such that the filling level in the tank remains at the same height. The hot melt flows onto a cold cooling roller, on which it solidifies and breaks up into flakes. The flakes subsequently drop into a crushing and milling plant, wherein a powder having an average particle size distribution of 125–250 μm is formed. The powder is conveyed continuously out of the milling plant into a silo. Depending on the quantitative proportions when charging the reaction tank, the powder consists of approximately 90% of potassium cyanate and approximately 9–10% of potassium carbonate. The calculated exploitation of urea is approximately 80%. Only traces of cyanide are detected in the product.

Example 2

If there is an increased excess of urea (for example, 280 kg of urea to 232 kg of potash), a 98% potassium cyanate with only a small proportion of potash is obtained (reaction temperature 395° C.). The exploitation of urea falls to 68%. The product contains approximately 20–40 ppm of potassium cyanide besides almost 2% of other by-products, for example, cyanuric acid. The isolated hexamethylenetetramine no longer gives a clear solution in water and methanol. In the second washer sparingly-soluble urea-formaldehyde polymers have formed, which—although present in small quantities only—greatly restrict the usability of the hexamethylenetetramine isolated.

Example 3

A powder consisting of 90% of potassium cyanate and 10% of potassium carbonate prepared according to the method of Example 1 is mixed with the proportion of soda required to give the properties of a hardening salt (22% of soda to 78% of potassium salt mixture). Apart from conventional crystalline soda (sodium carbonate) mixtures of finely-ground soda are also prepared, with the fineness of grind having an average particle size of between 20 and 125 μm.

The mixtures were pressed with a compacting mill to form egg-shaped briquettes. The applied pressure of the rollers was adjusted so as to produce a specific pressure of 65–100 kN/cm. The pressure is optimal within this range.

Under the above conditions the following series of tests were conducted on 100 kg samples of the powder mixture.

1) Pressing of powder mixtures at 20° C., 115° C., 125° C., 180° C. and 190° C.

2) Pressing at 115°–125° C. of powder mixtures, wherein the proportion of soda was coarsely and finely ground.

After conducting the tests, the test material was screened and the proportion that had become lumpy was determined by weighing. On comparison it became apparent that the best results were obtained in the tests with the finely-ground soda and the tests at more elevated temperatures. At a temperature of 180°–190° C., between 82–91% of the test material was compacted.

At the same time it showed high compressive strength and breaking strength in the appropriate stability tests. The tests at room temperature and with coarsely-grained soda proceeded very badly (10–30% briquettes/loud noises during compaction/low breaking strength of the briquettes).

Further variations and modifications of the foregoing will be apparent to those skilled in the art and are intended to be encompassed by the claims appended hereto.

German priority document P 43 224 740.7 is relied on and incorporated herein by reference.

We claim:

1. A method for the preparation of a salt mixture useful for the purpose of hardening steel parts, composed of potassium cyanate, potassium carbonate and sodium carbonate in shaped form, comprising first reacting 2.2 to 2.3 moles of urea with 1 mole of potassium carbonate to form potassium cyanate and potassium carbonate as a reaction product, grinding the reaction product into a powder, mixing the said powder with powdered sodium carbonate to form a mixture, pressing said mixture into a composite which is a shaped salt mixture.

2. The method according to claim 1 wherein urea is reacted with potassium carbonate at between 350° and 400° C.

3. The method according to claim 1 wherein the powder having an average particle size of from 125 to 250 μm.

4. The method according to claim 1 wherein the sodium carbonate has an average particle size of from 20 to 125 μm.

5. The method according to claim 1 further comprising wherein ammonia is formed during said reacting and recovering said ammonia in the form of hexamethylenetetramine solutions by means of formaldehyde.

6. The method according to claim 1 further comprising wherein the pressing is carried out at temperatures of from 80° to 230° C. and pressures of from 65 to 100 kN/cm$^2$.

7. A shaped salt mixture formed by the method according to claim 1.

8. A method for the preparation of a salt mixture useful for the purpose of hardening steel parts, composed of potassium cyanate, potassium carbonate and sodium carbonate in shaped form, comprising a first stage of reacting 2.2 to 2.3 moles of urea with an excess of potassium carbonate to form a melt of potassium cyanate and potassium carbonate as the reaction product, a second stage of cooling said melt to solidify as a solid and grinding the resulting solid into a powder, mixing the said powder with finely divided powdered sodium carbonate to form a mixture, and pressing said mixture into shaped salt mixture composites.

9. The method according to claim 8 wherein urea is reacted with potassium carbonate at between 350° to 400° C.

10. The method according to claim 8 further comprising wherein ammonia is formed during said first stage and recovering the ammonia in the form of hexamethylenetetramine solution by means of formaldehyde.

11. The method according to claim 8 wherein said sodium carbonate is prepared by grinding again a fine grained sodium carbonate prior to pressing.

12. The method according to claim 8 wherein the temperature of the mixture prior to pressing is at least 80° C.

13. The method according to claim 8 further comprising wherein the pressing is carried out at temperatures of from 80° to 230° C. and pressures of from 65 to 100 kN/cm$^2$.

* * * * *